(12) United States Patent
Gandhi et al.

(10) Patent No.: US 12,713,282 B2
(45) Date of Patent: Aug. 18, 2026

(54) PREDICTIVE TRAFFIC IDENTIFIER-TO-LINK UPDATES IN WIRELESS NETWORKS

(71) Applicant: Cisco Technology, Inc., San Jose, CA (US)

(72) Inventors: Indermeet S. Gandhi, San Jose, CA (US); Robert E. Barton, Richmond (CA); Jerome Henry, Pittsboro, NC (US); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 18/345,650

(22) Filed: Jun. 30, 2023

(65) Prior Publication Data

US 2024/0015565 A1 Jan. 11, 2024

Related U.S. Application Data

(60) Provisional application No. 63/367,996, filed on Jul. 8, 2022.

(51) Int. Cl.
*H04W 28/02* (2009.01)

(52) U.S. Cl.
CPC ... *H04W 28/0263* (2013.01); *H04W 28/0268* (2013.01)

(58) Field of Classification Search
CPC ......... H04W 28/0263; H04W 28/0268; H04W 84/12; H04W 36/06
See application file for complete search history.

(56) References Cited

U.S. PATENT DOCUMENTS 6,286,104 B1 * 9/2001 Buhle .................. H04L 63/105
707/999.009
2021/0014911 A1 1/2021 Patil et al.
2022/0038359 A1 2/2022 Svennebring et al.
(Continued)

FOREIGN PATENT DOCUMENTS

WO 2021141449 A1 7/2021
WO 2021185211 A1 9/2021
WO 2022026527 A1 2/2022

OTHER PUBLICATIONS

International Search Report and Written Opinion for International Application No. PCT/US2023/069691, mailed Oct. 27, 2023, 18 Pages.

(Continued)

*Primary Examiner* — Mandish K Randhawa
(74) *Attorney, Agent, or Firm* — Patterson + Sheridan, LLP

(57) ABSTRACT

Systems and techniques for performing traffic management in a wireless network using predictive traffic identifier (TID)-to-link mapping are described. An example technique includes obtaining one or more metrics associated with communication between a client station (STA) and an access point (AP) in a wireless network. The communication between the client STA and the AP is based on a first TID-to-link map. A second TID-to-link map is determined, based at least in part on evaluating the one or more metrics with a machine learning model. Communications between the client STA and AP are performed, based on the second TID-to-link map.

20 Claims, 6 Drawing Sheets

(56) References Cited

U.S. PATENT DOCUMENTS

| | | | | |
|---|---|---|---|---|
| 2022/0124855 | A1 | 4/2022 | Hu et al. | |
| 2023/0007564 | A1 * | 1/2023 | Balasubramanian ........................ | H04L 25/0254 |
| 2023/0115361 | A1 | 4/2023 | Kim et al. | |
| 2023/0239786 | A1 * | 7/2023 | Dasam .............. | H04W 52/0229 370/235 |
| 2023/0247698 | A1 * | 8/2023 | Liu ................... | H04W 28/0252 370/329 |
| 2023/0291677 | A1 * | 9/2023 | Trakinat ............. | G06Q 20/3674 |

OTHER PUBLICATIONS

Lopez-Raventos A., et al., "Multi-link Operation in IEEE 802.11be WLANs", IEEE Wireless Communications, Coordinated Science Laboratory, Department of Electrical and Computer Engineering, University of Illinois at Urbana-champaign, US, vol. 29, No. 4, May 6, 2022, pp. 94-100, XP011924090, p. 2, left-hand column, line 11-p. 5, right-hand column, line 57.

Murti W., et al., "Multi-Link Operation with Enhanced Synchronous Channel Access in IEEE 802.11be Wireless LANs: Coexistence Issue and Solutions", MDPI, Sensors, Nov. 29, 2021, vol. 21, No. 7974, 24 Pages, Retrieved from URL: https://doi.org/10.3390/s21237974.

* cited by examiner

PREDICTIVE TRAFFIC IDENTIFIER-TO-LINK UPDATES IN WIRELESS NETWORKS

CROSS-REFERENCE TO RELATED APPLICATIONS

This application claims benefit of U.S. provisional patent application Ser. No. 63/367,996 filed Jul. 8, 2022. The aforementioned related patent application is herein incorporated by reference in its entirety.

TECHNICAL FIELD

Embodiments presented in this disclosure generally relate to wireless communications. More specifically, embodiments disclosed herein related to systems and techniques for performing traffic management in a wireless network using predictive traffic identifier (TID)-to-link mapping.

BACKGROUND

Wireless communication standards, such as the Institute of Electrical and Electronics Engineers (IEEE) 802.11 technical standard, are continuing to evolve to meet the ever increasing demands of bandwidth intensive and low latency services, such as video conferencing, augmented/extended reality, cloud gaming, and other real-time applications. For example, recent amendments to IEEE 802.11 (e.g., IEEE 802.11be amendment) aim to introduce higher data rates using higher modulation orders, larger channel widths, and additional spatial streams, as well as a set of new features such as multi-link operation (MLO).

MLO enables devices, such as access points (APs) and client stations (STAs), to simultaneously send and receive data across different frequency bands and channels. With MLO, multiple links can be established between the client STA and the same or different AP to increase throughput, reduce latency, and improve reliability. MLO thus enables a multi-link AP logical entity and a multi-link non-AP logical entity to use multiple paths for user plane traffic.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
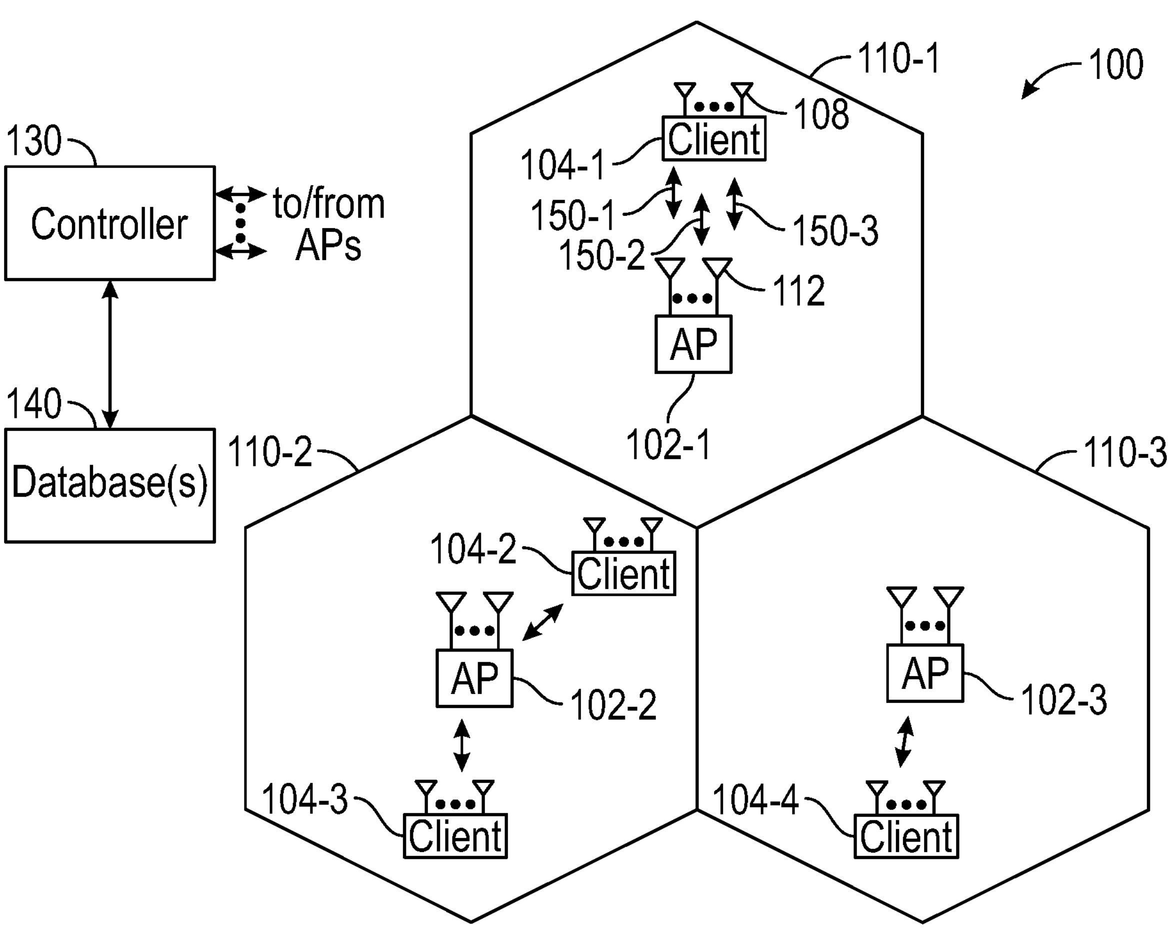
FIG. 1 illustrates an example system, according to one embodiment.

One embodiment described herein is a computer-implemented method. The computer-implemented method includes obtaining one or more metrics associated with communication between a client station (STA) and an access point (AP) in a wireless network. The communication between the client STA and the AP is based on a first traffic identifier (TID)-to-link map. The computer-implemented method also includes determining a second TID-to-link map, different from the first TID-to-link map, based at least in part on evaluating the one or more metrics with a machine learning (ML) model. The computer-implemented method further includes performing communications between the client STA and the AP, based on the second TID-to-link map.

Another embodiment described herein is a system. The system includes a memory and a processor communicatively coupled to the memory. The processor is configured to perform an operation. The operation includes obtaining one or more metrics associated with communication between a client station (STA) and an access point (AP) in a wireless network. The communication between the client STA and the AP is based on a first traffic identifier (TID)-to-link map. The operation also includes determining a second TID-to-link map, different from the first TID-to-link map, based at least in part on evaluating the one or more metrics with a machine learning (ML) model. The operation further includes performing communications between the client STA and the AP, based on the second TID-to-link map.

Another embodiment described herein is a computer-readable storage medium. The computer-readable storage medium includes computer executable code, which when executed by one or more processors, performs an operation. The operation includes obtaining one or more metrics associated with communication between a client station (STA) and an access point (AP) in a wireless network. The communication between the client STA and the AP is based on a first traffic identifier (TID)-to-link map. The operation also includes determining a second TID-to-link map, different from the first TID-to-link map, based at least in part on evaluating the one or more metrics with a machine learning (ML) model. The operation further includes performing communications between the client STA and the AP, based on the second TID-to-link map.

Example Embodiments

Certain wireless systems (e.g., IEEE 802.11 be and later) may support traffic identifier (TID)-to-link mapping as a traffic management mechanism in wireless networks. With TID-to-link mapping functionality, MLO compliant devices may transmit, receive, or transit and receive with different quality-of-service (QoS) standards over multiple links. That is, different TIDs may be mapped to different links, in order to minimize, for example, access delays for time-sensitive traffic. As a reference example, an AP may assign certain links (e.g., 5 gigahertz (GHz) link or 6 GHz link) to QoS-sensitive traffic (e.g., real-time collaborative applications, such as teleconferencing applications), and assign other links to other types of traffic, such as best effort traffic from a video streaming service.

When a client STA is in close proximity to the AP, using TID-to-link mapping to allocate dedicated links for QoS-sensitive applications may be beneficial in terms of latency, throughput, and other application performance metrics. However, as the client STA starts to move away from the AP (e.g., towards to edge of the cell), the application performance may degrade and negatively impact the user experience. One way to handle such client mobility situations may involve the AP waiting for the signal strength levels (e.g., received signal strength indication (RSSI) levels) on the link(s) allocated to QoS-sensitive traffic to fall below a certain threshold before moving the QoS-sensitive traffic to another link.

However, in many cases, the application performance may have already degraded by the time the AP detects that signal strength levels have reached the particular threshold. Additionally, waiting for signal strength levels to reach a certain threshold can result in ping pong behavior between multiple links, which, in turn, can significantly impact the user experience (e.g., poor video quality, increased jitter, etc.) due in part to retries and potentially disconnection of the application.

To address this, embodiments described herein provide systems and techniques for performing traffic management in a wireless network using predictive TID-to-link mapping. More specifically, certain embodiments described herein provide techniques for using artificial intelligence (AI)/machine learning (ML) methods to accurately predict when application performance for a given link is going to degrade and to dynamically trigger switch of the application traffic to another link (e.g., before the application performance degrades). In certain embodiments, switching application traffic to another link may be triggered by updating the TID-to-link map for the wireless network. By dynamically updating TID-to-link maps prior to a degradation in the application performance, embodiments described herein can significantly improve performance of the wireless network for QoS-sensitive applications.

Note, the techniques described herein for performing traffic management in a wireless network using predictive TID-to-link mapping may be incorporated into (such as implemented within or performed by) a variety of wired or wireless apparatuses (such as nodes). In some implementations, a node includes a wireless node. Such wireless nodes may provide, for example, connectivity to or for a network (such as a wide area network (WAN) such as the Internet or a cellular network) via a wired or wireless communication link. In some implementations, a wireless node may include an AP, a controller, or a client STA.

Additionally, as used herein, the terms "QoS-sensitive" application, "QoS-sensitive" application flow (or application traffic), and "QoS-sensitive" communication link (or link) may refer to an application, application flow, and communication link, respectively, that have a predefined QoS target or requirement. Similarly, the terms "non-QoS-sensitive" application, "non-QoS-sensitive" application flow (or application traffic), and "non-QoS-sensitive" communication link (or link) may refer to an application, application flow, and communication link, respectively, that do not have a predefined QoS target or requirement. In general, QoS-sensitive applications/application flows/communication links may not be able to tolerate the effects of packet loss, delay (also known as latency) (including delay variation or jitter), and fluctuations in network throughput without a degradation in application performance. On the other hand, non-QoS-sensitive applications/application flows/communication links may be able to tolerate (a greater amount of) the effects of packet loss, delay (also known as latency) (including delay variation or jitter), and fluctuations in network throughput, compared to QoS-sensitive applications/application flows/communications, without a degradation in application performance.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

FIG. 1 illustrates an example system 100 in which one or more techniques described herein can be implemented, according to one embodiment. As shown, the system 100 includes one or more APs (e.g., AP 102-1, AP 102-2, and AP 102-3), one or more client STAs (e.g., client STA 104-1, client STA 104-2, client STA 104-3, and client STA 104-4), a controller 130, and one or more databases 140. An AP is generally a fixed station that communicates with client STA(s) and may be referred to as a base station, wireless device, or some other terminology. A client STA may be fixed or mobile and also may be referred to as a mobile STA, a client, a STA, a wireless device, or some other terminology. Note that while a certain number of APs and client STAs are depicted, the system 100 may include any number of APs and client STAs.

As used herein, an AP along with the STAs associated with the AP (e.g., within the coverage area (or cell) of the AP) may be referred to as a basic service set (BSS). Here, AP 102-1 is the serving AP for client STA 104-1, AP 102-2 is the serving AP for client STAs 104-2 and 104-3, and AP 102-3 is the serving AP for client STA 104-4. The AP 102-1, AP 102-2, and AP 102-3 are neighboring (peer) APs. The APs 102 may communicate with one or more client STAs 104 on the downlink and uplink. The downlink (e.g., forward link) is the communication link from the AP 102 to the client STA(s) 104, and the uplink (e.g., reverse link) is the communication link from the client STA(s) 104 to the AP 102. In some cases, a client STA may also communicate peer-to-peer with another client STA.

As shown in FIG. 1, each client STA 104 includes one or more radios 108. The client STA 104 can use one or more of the radios 108 to form links 150 with an AP 102. As also shown, each AP 102 includes one or more radios 112 that the AP 102 can use to form links 150 with one or more client STAs 104. In general, the AP(s) 102 and the client STA(s) 104 may form any suitable number of links 150 for communication using any suitable frequencies or bands.

In some instances, a client STA 104 may form multiple links 150 with a single AP 102. For example, a client STA 104-1 can use a first radio 108-1 operating on a first band (e.g., 5 GHz band) to establish a first link 150-1 with AP 102-1, a second radio 108-2 operating on a second band (e.g., 6 GHz band) to establish a second link 150-2 with the AP 102-1, a third radio 108-3 operating on a third band (e.g., 2.4 GHz band) to establish a third link 150-3 with the AP 102-1, and so on.

In some instances, a client STA may form multiple links 150 across multiple APs 102. For example, a client STA 104-1 can use a first radio 108-1 operating on a first band (e.g., 5 GHz band) to establish a first link with AP 102-1 and use a second radio 108-2 operating on a second band (e.g., 6 GHz band) to establish a second link with AP 102-2. In general, each client STA 104 may establish multiple communication links across one or more APs 102. Similarly, each AP 102 may establish multiple communication links across one or more client STAs 104. Example hardware that may be included in an AP 102 and a client STA 104 is discussed in greater detail in regard to FIG. 6.

The controller 130 couples to and provides coordination and control for the APs 102 1-3. For example, the controller 130 may handle adjustments to RF power, channels, authentication, and security for the APs. The controller 130 may also assign and coordinate the links 150 formed by the client STA(s) 104 with the APs 102. In certain embodiments described herein, the controller 130 can perform or handle traffic management for the APs 102 1-3. For example, the controller 130 can generate and transmit (updated) TID-to-link maps to the APs 102 1-3. The TID-to-link map(s) may indicate which application traffic is allocated to a given communication link between the APs 102 1-3 and their respective client STAs.

As shown, the controller 130 may be communicatively coupled to (or integrated with) one or more databases 140. The database(s) 140 are representative of storage systems that may include information on one or more communication links in the system 100. For example, the database(s) 140 may include different types of metrics, including application performance metrics (e.g., frame retransmission counters, jitter, latency, delay, etc.), communication link metrics (e.g., RSSI, modulation and coding scheme (MCS), etc.), sensing metrics (e.g., channel state information (CSI) data, sensing reports, etc.), list of applications, or a combination thereof. The database(s) 140 may also include logic (e.g., AI/ML models) for (i) predicting when application performance on a communication link will degrade, (ii) generating (updated) TID-to-link maps to switch application traffic to another link, or (iii) a combination thereof.

In certain embodiments, the controller 130 is included within or integrated with an AP 102 and coordinates the links 150 formed by that AP 102 (or otherwise provides control for that AP). For example, each AP 102 may include a controller that provides control for that AP. In certain embodiments, the controller 130 is separate from the APs 102 and provides control for those APs. In FIG. 1, for example, the controller 130 may communicate with the APs 102 1-3 via a (wired or wireless) backhaul. The APs 102 1-3 may also communicate with one another, e.g., directly or indirectly via a wireless or wireline backhaul. Example hardware that may be included in a controller 130 is discussed in greater detail with regard to FIG. 6.

As noted, the system 100 supports MLO operation in which multiple links 150 can be established between the client STA and the same or different AP to allow for concurrent data transmission and reception. In such a system, one or more of the client STAs 104 may be referred to as STA multi-link devices (MLDs) (e.g., a STA or client device acting as a MLD) and/or one or more of the APs 102 may be referred to as AP MLDs (e.g., an AP that acts as a MLD). The STA MLD and AP MLD are generally representative of any device capable of performing multi-link operations. A MLD may generally be classified based on whether it is a single radio MLD or multi-radio MLD. Single radio MLDs generally use a single radio to switch between one or more links. One category of single radio MLDs is Enhanced Multi-Link Single Radio (eMLSR). eMLSR devices generally operate one main wireless radio that can transmit and/or receive data frames on a given link, but can detect some data (e.g., short initial frames) on a set of other links when the device is not actively transmitting or receiving. Multi-radio MLDs may generally be classified into the following two types: (i) simultaneous transmission and reception (STR) MLD and (ii) non-STR MLD. For STR MLDs, a transmission on one link may not affect the operations of frame reception and clear channel assessment (CCA) on other links. Stated differently, for STR MLDs, individual links can operate independently of each other. For non-STR MLDs, operation on one link may be restricted by operation on another link. For example, a transmission on one link may not be allowed if it will cause reception interruption on another link. In another example, a reception or CCA on one link may not be allowed if a transmission is ongoing on another link.

As noted, one issue with systems that support MLO is that, when TID-to-link mapping is used to assign traffic to certain links, client STAs may experience a degradation in application performance in certain conditions, such as client STA movement towards the edge of a 5 GHz or 6 GHz low power cell, as an illustrative, non-limiting example. Accordingly, in certain embodiments described herein, the system can use AI/ML techniques to accurately predict when the application performance will start to degrade and to dynamically trigger a switch of the application to another communication link (e.g., via an updated TID-to-link map), before the application performance degrades.

Figure 2:
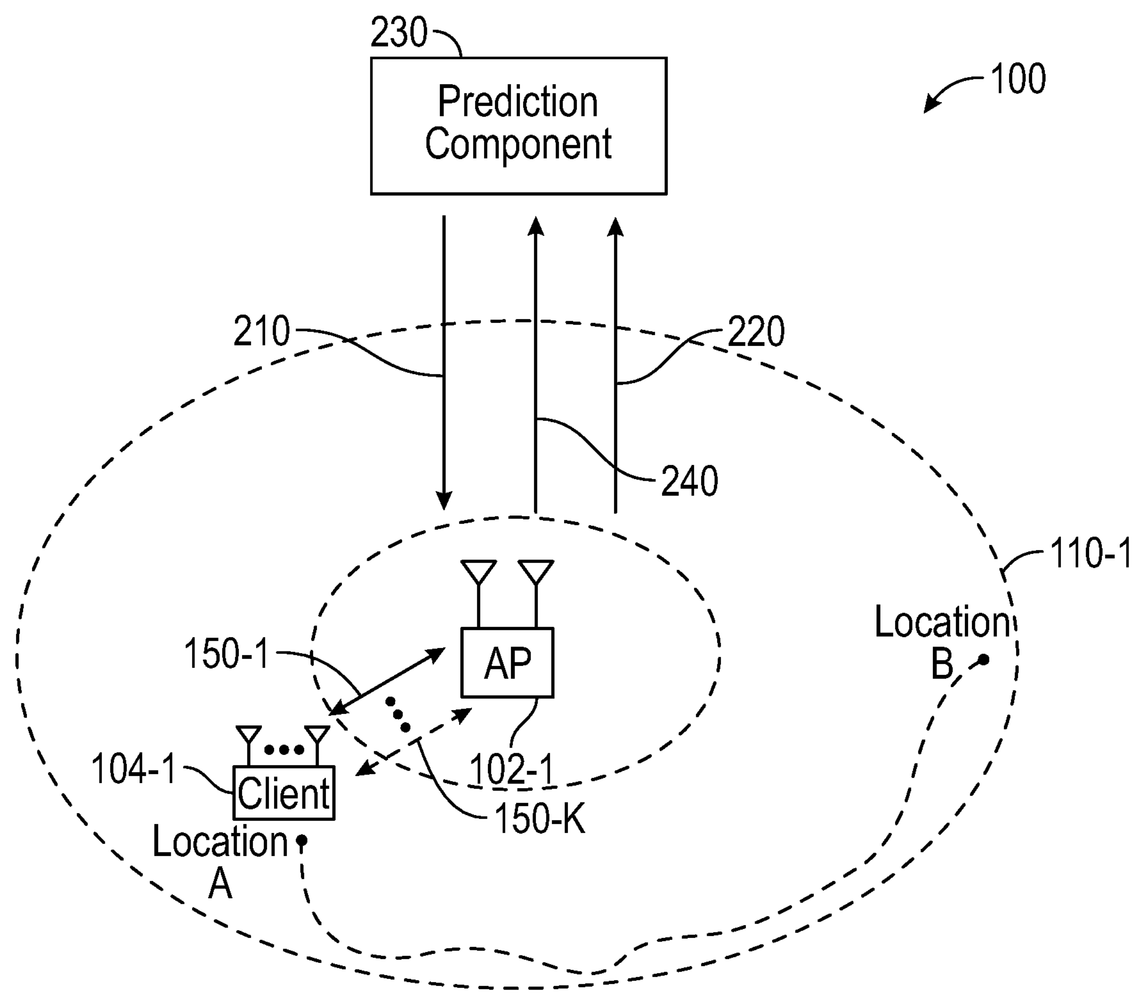
FIG. 2 further illustrates certain components of the system depicted in FIG. 1, according to one embodiment.

Consider, for example, FIG. 2 which further depicts certain components of the system 100 depicted in FIG. 1, according to one embodiment. As shown, the system 100 includes a prediction component 230, which is configured to perform one or more techniques described herein. The prediction component 230 may include hardware, software, or combinations thereof. In certain embodiments, the prediction component 230 is integral with the controller 130. In certain embodiments, the prediction component 230 is external to and communicatively coupled to the controller 130 and/or the database 140. In certain embodiments, the prediction component 230 may be included in a cloud computing environment.

In certain embodiments, the prediction component 230 is configured to use one or more AI/ML techniques/models to analyze one or more metrics received from the AP 102-1. Such metrics can include any combination of application metrics, communication link metrics, sensing metrics, and a list of applications running on the client STAs, as illustrative, non-limiting examples. In FIG. 2, for example, AP 102-1 may be capable of running an edge application in a container (e.g., Docker container) that can collect application-specific telemetry and performance data from a client application(s) running on the client STA 104-1. For instance, a video teleconferencing edge application hosted on the AP 102-1 may collect telemetry data from a video teleconferencing client running on the client STA 104-1 and may report the telemetry data to the prediction component 230.

In the embodiment depicted in FIG. 2, the application metrics collected by the AP 102-1 may include application type, frame (re)-transmission counters, jitter, latency, frame delay, and mean opinion score (MOS), as illustrative, non-limiting examples. The AP 102-1 may transmit a message 220 with an indication of the collected application metrics to the prediction component 230. Note, in certain embodiments, if the AP 102-1 is not capable of running an edge application in a container, a remote server (not shown) can report the application metrics to the prediction component 230. In such embodiments, the remote server may be integral to or otherwise communicatively coupled to the controller 130.

In certain embodiments, the AP may also collect communication link metrics associated with one or more communication links established between the AP 102 and client STA(s) 104. With reference to FIG. 2, the AP 102-1, by default, may initially assign a 6 GHz low power indoor (LPI) link or a 5 GHz link to QoS-sensitive applications (e.g., video teleconferencing, AR/VR applications, cloud gaming, etc.). The AP 102-1 may assign lower performance or coverage links (e.g., 6 GHz standard power (SP) link or 2.4 GHz link) to non-QoS-sensitive applications (e.g., streaming application). When the client STA 104-1 joins the AP 102-1 (e.g., during association), the AP 102-1 may communicate this default policy to the client STA 104-4 using a (initial) TID-to-link-map.

As the client STA 104-1 performs communications (based on the initial TID-to-link-map), the AP 102-1 may continually collect communication link metrics, such as signal strength (e.g., RSSI), MCS, and number of retransmissions, as illustrative, non-limiting examples, on each of the wireless communication links 150 established with the client STA 104-1. Additionally, in certain embodiments, the AP 102-1 can obtain one or more sensing metrics (e.g., CSI data, sensing reports, etc.) associated with mobility of the client STA 104-1. In one example, the AP 102-1 can measure the CSI for the client STA 104-1 in order to determine the client STA's movement. For instance, the AP 102-1 can determine whether the client STA is moving towards the AP, such as from location B to location A, or whether the client STA is moving away from the AP, such as from location A to location B. In another example, the AP 102-1 can perform periodic sensing feedback (e.g., in accordance with IEEE 802.11bf sensing request/feedback protocol) with the client STA 104-1 to determine the client STA's movement. In certain embodiments, the AP 102-1 may perform periodic sensing on the QoS-sensitive link and with client STAs 104 that have QoS-sensitive applications running. This correlation of movement sensing to the QoS-sensitive links may form the basis of a classification system to predict the optimal link according to one or more metrics for each application. In the embodiment depicted in FIG. 2, the AP 102-1 may transmit, to the prediction component 230, a message 240 with an indication of the communication link metrics, sensing metrics, or a combination thereof.

In certain embodiments, the prediction component 230 may use the collected metrics (e.g., application metrics, communication link metrics, sensing metrics, or a combination thereof) to train an AI/ML model(s) to (i) predict when application performance will start to degrade, (ii) predict which communication link will meet an optimal application-level performance (according to one or more metrics), or (iii) a combination thereof. The prediction component 230 may use a variety of AI/ML techniques to train an AI/ML model including, for example, neural networks, logistic regression, and gradient boosting algorithms, as illustrative, non-limiting examples.

The prediction component 230 uses the collected metrics to train an AI/ML model that results in a classification of which communication link to use for application traffic that will meet an optimal level of performance for the application. In certain embodiments, this classification is in the form of an updated TID-to-link map. For example, as shown in FIG. 2, the prediction component 230 may transmit a message 210 with an indication of the updated TID-to-link map to the AP 102-1. The AP 102-1 may then use the updated TID-to-link map to switch the application traffic from the client STA 104-2 to another link. For instance, the application traffic may be switched from communication link 150-1 to one of communication links 150 2-K, based on the updated TID-to-link map. The communication link 150-1 may be associated with a different radio of the AP 102-1 than each of the communication links 150 2-K.

Note that while the above describes the prediction component 230 deploying a trained AI/ML model to generate an updated TID-to-link map, in other embodiments, the trained AI/ML model may be deployed elsewhere, such as at the AP 102 and/or at the client STA 104. In such embodiments, the message 210 may include an indication of the trained AI/ML model, the updated TID-to-link map, or a combination thereof.

In one illustrative example, the prediction component 230 can collect the various metrics in a data set that is used to train an AI/ML model. The ML model may be an edge application or a central model for the entire cell 110. Once trained, the prediction component 230 can deploy the AI/ML model at the AP 102-1. The AP 102-1 may use the AI/ML model to analyze current metrics, including CSI, RSSI, etc., and to output a TID-to-link map that indicates which communication link 150 to move an application flow to. In another illustrative example, the trained AI/ML model can be deployed at the client STA 104-1. In this example, the client STA 104-1 can use the trained AI/ML model to analyze current metrics and to output a TID-to-link map that indicates which communication link 150 to move an application flow to.

Figure 3:
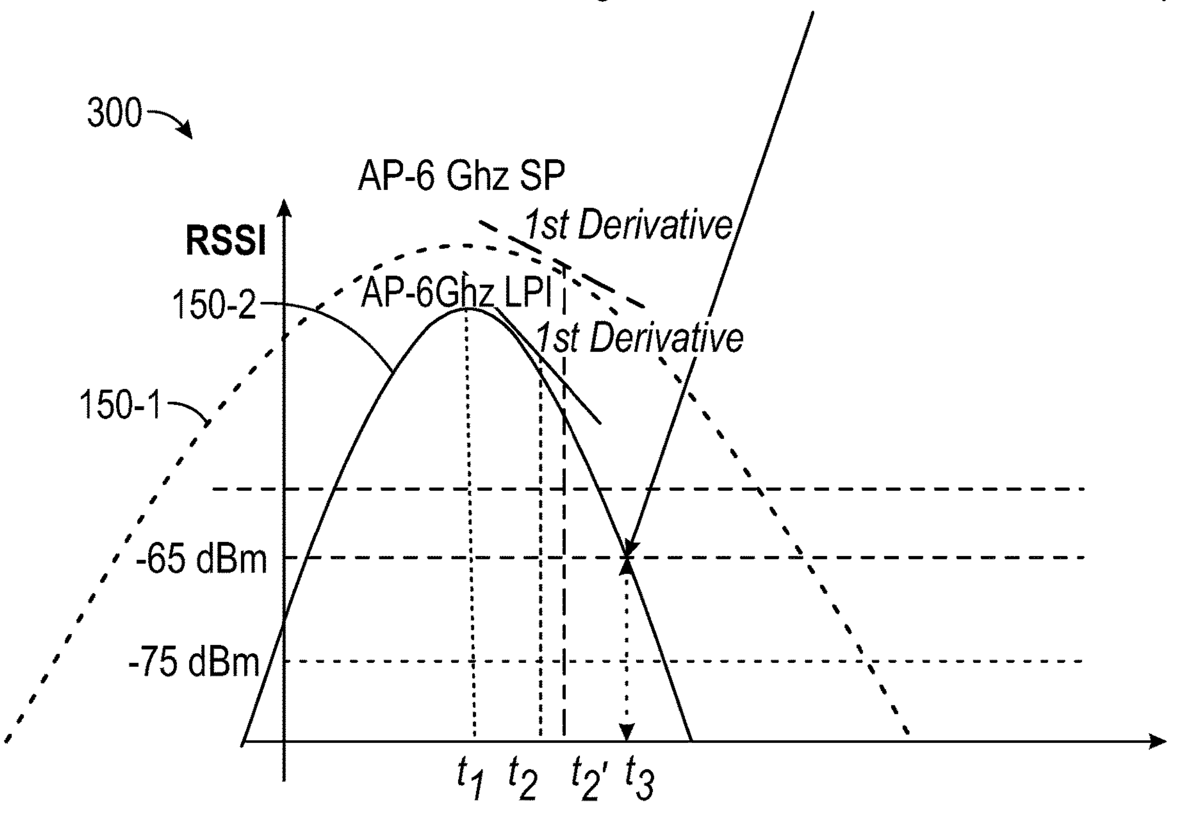
FIG. 3 illustrates an example graph of a performance metric of a client STA communicating over different communication links, according to one embodiment.

Consider FIG. 3 which illustrates an example graph 300 of a performance metric (e.g., RSSI) of a client STA 104 communicating over different communication links, according to one embodiment. Note that while graph 300 uses RSSI as an example of a performance metric, in other embodiments, a similar graph can be used for other performance metrics, such as CSI, as an illustrative, non-limiting example. Here, at a first time instance ($t_1$), the client STA 104 is associated with communication link 150-1 (e.g., 6 GHz LPI communication link) and communication link 150-2 (e.g., 6 GHz SP communication link). At the first time instance ($t_1$), the client STA 104 may use communication link 150-1 to run QoS-sensitive application(s). The trained AI/ML model can use the movement of the client STA 104 detected through CSI metrics and changes in MCS and RSSI (on both the communication links 150 1-2 as well as any additional computing devices belonging to the user, such as a smart watch, AR/VR headset, etc.) to (i) determine that the client STA 104 is moving towards the edge of the QoS-sensitive cell (e.g., from location A to location B) and (ii) determine whether the communication link 150-2 is capable of handling the QoS-sensitive application.

For example, the trained AI/ML model may predict what the RSSI levels (as well as other metrics) of the client STA 104 will be at subsequent second time instance ($t_2$) and subsequent third time instance ($t_3$), for each of the communication links 150 1-2. The trained AI/ML model may determine that, at the third time instance ($t_3$), (i) the communication link 150-1 will be unsuitable for the QoS-sensitive application and (ii) the communication link 150-2 will be suitable for the QoS-sensitive application. Accordingly, the trained AI/ML model may output a predictive command to the AP 102 to adjust the TID-to-link map for the client STA 104 (e.g., prior to time instance $t_3$), as the existing communication link 150-1 may not be suitable for QoS-sensitive communication and the application performance may begin to degrade by time instance $t_3$. As shown in FIG. 3, for example, the TID-to-link map may be updated so that the QoS-sensitive application is moved from the communication link 150-1 (e.g., 6 GHz LPI communication link) to the communication link 150-2 (e.g., 6 GHz SP communication link or 2.4 GHz communication link) at time instance $t_3$.

Additionally or alternatively, in certain embodiments, the trained AI/ML model may output a predictive command to the AP 102 to adjust the TID-to-link map for other client STAs using non-QoS-sensitive links, so that the non-QoS-sensitive links can be made available for QoS-sensitive traffic. For example, the trained AI/ML model can update the TID-to-link maps of other client STAs 104 that are closer to the AP to move some of their non-QoS-sensitive applications to a QoS-sensitive link (if available). As shown in FIG. 3, the TID-to-link maps of other client STAs 104 using non-QoS-sensitive links are updated at time instance $t_3$, so that the non-QoS-sensitive links can be made available for QoS-sensitive traffic. Note that, in some cases, if the other non-QoS-sensitive links are overloaded and/or cannot fulfill the latency target of the QoS-sensitive application, the trained AI/ML model can recommend to push certain applications to a communication link on another radio (e.g., 5 GHz communication link).

Figure 4:
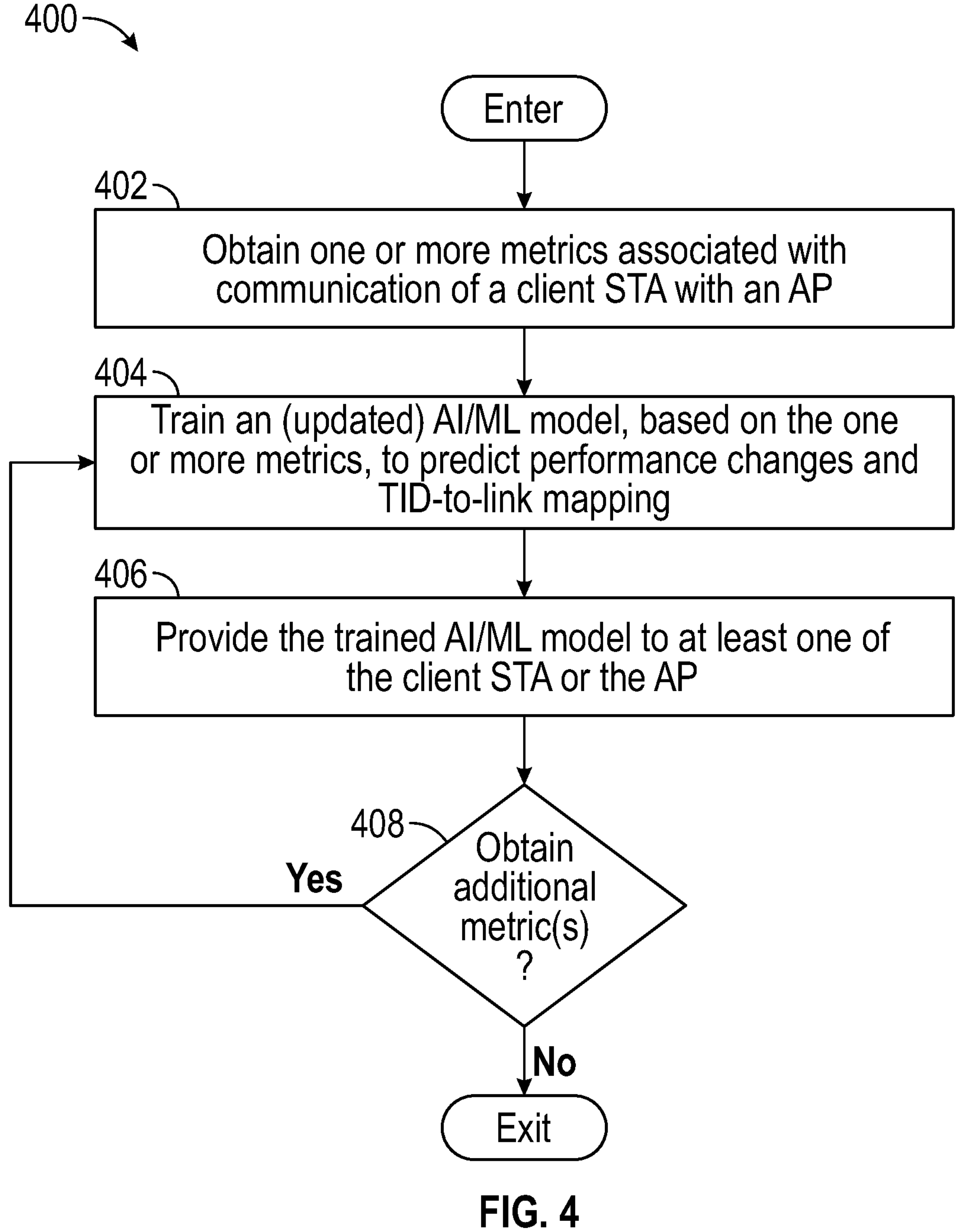
FIG. 4 is a flowchart of a method for performing traffic management in a wireless network, according to one embodiment.

FIG. 4 is a flowchart of an example method 400 for performing traffic management in a wireless network using predictive TID-to-link mapping, according to one embodiment. Method 400 may be performed by a prediction component (e.g., prediction component 230).

Method 400 enters at block 402, where the prediction component obtains one or more metrics associated with communication of a client STA (e.g., client STA 104) with an AP (e.g., AP 102). For example, the metrics may include application metrics, communication link metrics, sensing metrics, list of applications running on the client STA, or a combination thereof.

At block 404, the prediction component trains an AI/ML model, based on the one or more metrics, to predict performance changes and TID-to-link mapping. In one embodiment, the trained AI/ML model may be an initial AI/ML model that is trained based on the one or more metrics. In another embodiment, the trained AI/ML model may be an updated AI/ML model that is trained based on the one or more metrics.

At block 406, the prediction component provides the trained AI/ML model to at least one of the client STA or the AP. For example, as noted above, in one embodiment, the trained AI/ML model may be deployed at the AP. In another embodiment, the trained AI/ML model may be deployed at the client STA.

At block 408, the prediction component determines whether one or more additional metrics have been obtained. For example, as noted, the prediction component may continually obtain RF data (e.g., CSI, RSSI, SNR, etc.) and application metrics (e.g., application type, jitter, latency, etc.) as the client STA moves (e.g., within cell 110). In one embodiment, the prediction component may check for additional metrics based on a time interval, event, or some other criteria. If additional metrics have been obtained, the prediction component may train an updated AI/ML model at block 404. On the other hand, if additional metrics have not been obtained, the method 400 may exit.

Figure 5:
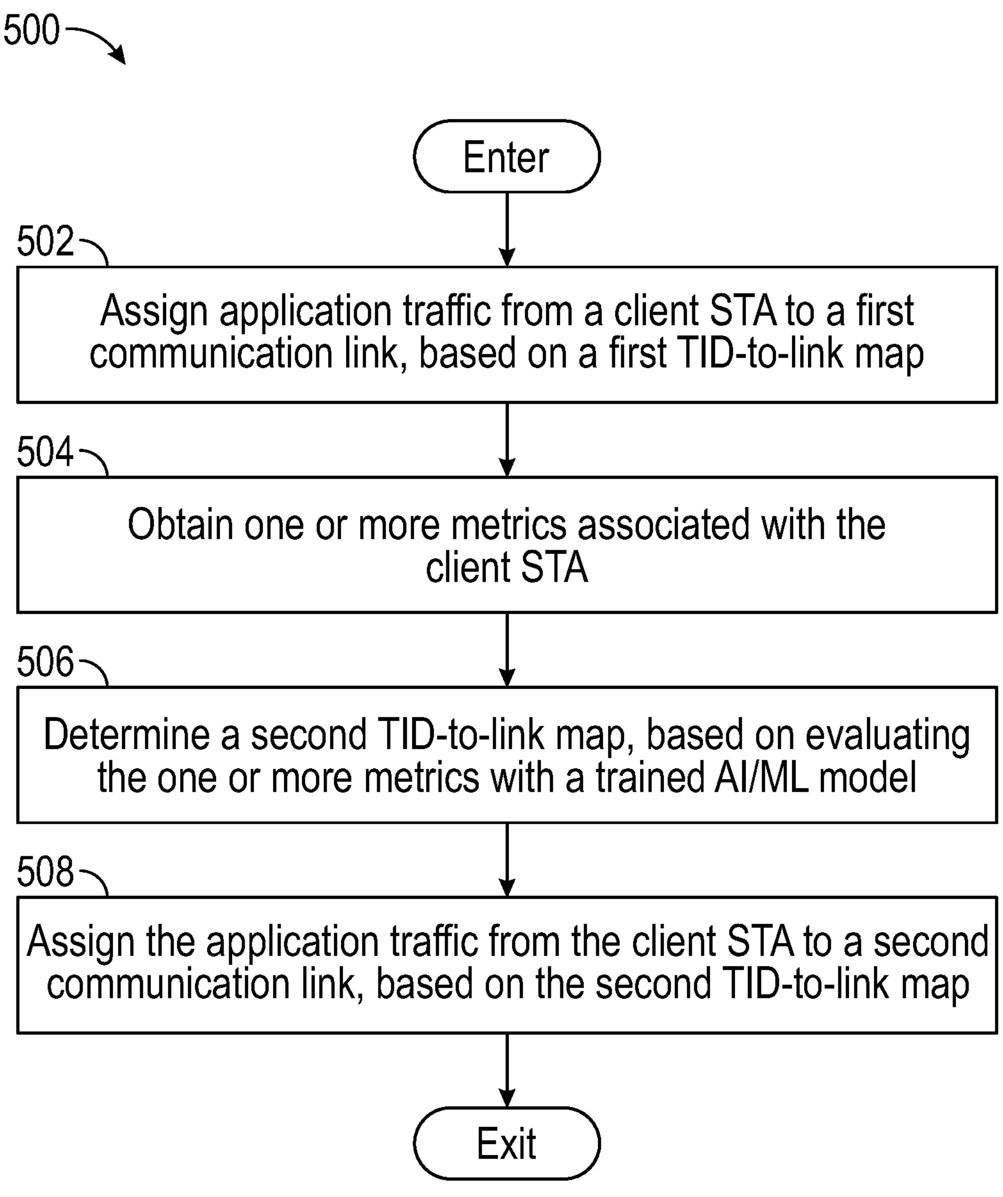
FIG. 5 is a flowchart of another method for performing traffic management in a wireless network, according to one embodiment.

FIG. 5 is a flowchart of an example method 500 for performing traffic management in a wireless network using predictive TID-to-link mapping, according to one embodiment. Method 500 may be performed by a computing device (e.g., prediction component 230, client STA 104, AP 102).

Method 500 enters at block 502, where the computing device assigns application traffic from a client STA to a first communication link, based on a first TID-to-link map. The application traffic may be QoS-sensitive application traffic from an application running on the client STA and may have a predefined (or target) performance criteria (e.g., QoS target). The first communication link may be associated with a first radio of the AP that is configured to at least one of (i) operate on a first band (e.g., 6 GHz) or (ii) operate using a first transmission power scheme (e.g., LPI operation).

At block 504, the computing device obtains one or more metrics associated with the client STA. The one or more metrics may include at least one of (i) one or more metrics associated with one or more applications running on the client STA, (ii) one or more metrics associated with one or more communication links established between the client STA and the AP, or (iii) one or more metrics associated with wireless sensing feedback from the client STA.

At block 506, the computing device determines a second TID-to-link map, based on evaluating the one or more metrics with a trained AI/ML model. For example, the AI/ML model may be trained using a dataset that includes at least one of (i) a set of application metrics, (ii) a set of communication link metrics, or (iii) a set of wireless sensing feedback. The trained AI/ML model may output at least one of (i) an indication of a time instance when the first communication link will not satisfy the predefined performance criteria associated with the application traffic from the client STA or (ii) an indication of a second communication link established between the client STA and the AP that satisfies the predefined performance criteria associated with the application traffic from the client STA.

At block 508, the computing device assigns the application traffic from the client STA to a second communication link, based on the second TID-to-link map. In one embodiment, assign the application traffic to the second communication link may include moving the application traffic from the first communication link to the second communication link prior to the time instance in which the application performance is predicted to degrade.

In one embodiment, the second TID-to-link map may be associated with a second radio of the AP that is configured to operate on a second band (e.g., 5 GHz or 2.4 GHz). In such an embodiment, the second communication link may be associated with the second radio of the AP that is configured to operate on the second band. In one embodiment, the second TID-to-link map may be associated with a second radio of the AP that is configured to operate on the first band (e.g., 6 GHz) using a second transmission power scheme (e.g., SP operation). In such an embodiment, the second communication link may be associated with the second radio of the AP that is configured to operate on the first band using the second transmission power scheme.

Figure 6:
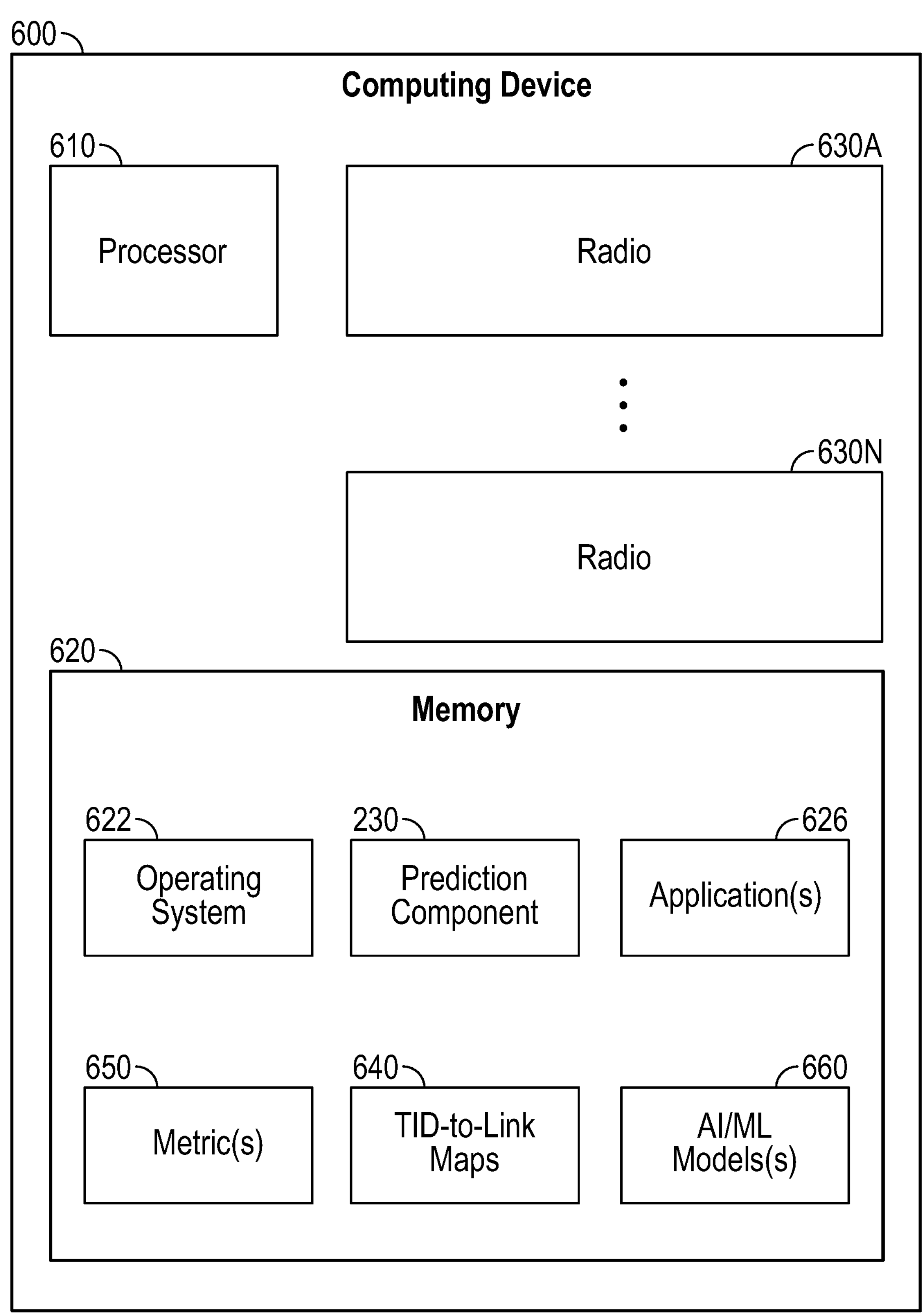
FIG. 6 illustrates an example computing device, according to one embodiment.

FIG. 6 illustrates an example computing device 600, according to one embodiment. The computing device 600 can be configured to perform one or more techniques described herein for performing traffic management using predictive TID-to-link mapping. For example, the computing device 600 can perform method 400, method 500, and any other techniques (or combination of techniques) described herein. The computing device 600 can be an AP (e.g., AP 102), a client STA (e.g., client STA 104), or a controller (e.g., controller 130). The computing device 600 includes a processor 610, a memory 620, and one or more radios 630_a-n_ (generally, radio 630).

The processor 610 may be any processing element capable of performing the functions described herein. The processor 610 represents a single processor, multiple processors, a processor with multiple cores, and combinations thereof. The radios 630 facilitate communications between the computing device 600 and other devices. The radios 630 are representative of communication interferences, such as wireless communications antennas and various wired communication ports. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 622 to manage various functions of the computing device 600. The memory 620 also includes a prediction component 230, one or more application(s) 626, one or more TID-to-link maps 640, one or more metrics 650 (e.g., application metrics, communication link metrics, wireless sensing feedback, or a combination thereof), and a trained AI/ML model(s) 660.

Advantageously, embodiments described herein provide techniques and systems for predictive TID-to-link mapping. By training an AI/ML model based on observed RF metrics as well as available data corresponding to various applications, to predict performance changes and perform TID-to-link mapping, embodiments can significantly improve the performance of communications in wireless networks. For example, the trained AI/ML model can be pushed to AP(s) and/or STA(s), which can use the trained AI/ML model to proactively select an updated TID-to-link map before application performance degrades. Additionally, as the RF conditions change, or as the client STA moves, the trained AI/ML model can be continually consulted to find the optimal TID-to-link map for the client STA.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:

obtaining one or more metrics associated with communication between a client station (STA) and an access point (AP) in a wireless network, wherein the communication between the client STA and the AP is based on a first traffic identifier (TID)-to-link map that allocates traffic from an application running on the client STA to a first communication link established between the client STA and the AP;

determining a second TID-to-link map, different from the first TID-to-link map, based at least in part on evaluating the one or more metrics with a machine learning (ML) model, wherein:

the ML model is configured to output an indication of a second communication link, different from the first communication link, established between the client STA and the AP that satisfies target performance criteria for the application;

the ML model is further configured to output an indication of a time instance when the first communication link established between the client STA and the AP will not satisfy the target performance criteria for the application; and the second TID-to-link map allocates the traffic from the application to the second communication link established between the client STA and the AP; and performing communications between the client STA and the AP on the second communication link, based on the second TID-to-link map, wherein performing the communications comprises moving the traffic from the first communication link to the second communication link prior to the time instance.

2. The computer-implemented method of claim 1, wherein:

the first communication link is associated with a first radio of the AP that is configured to operate on a first band; and the second communication link is associated with a second radio of the AP that is configured to operate on a second band.

3. The computer-implemented method of claim 1, wherein:

the first communication link is associated with a first radio of the AP that is configured to operate on a first band using a first transmission power scheme; and the second communication link is associated with a second radio of the AP that is configured to operate on the first band using a second transmission power scheme.

4. The computer-implemented method of claim 1, wherein the application is a quality-of-service (QoS)-sensitive application.

5. The computer-implemented method of claim 1, wherein the ML model is trained using a dataset comprising at least one of (i) a set of application metrics, (ii) a set of communication link metrics, or (iii) a set of wireless sensing feedback.

6. The computer-implemented method of claim 1, wherein the one or more metrics comprise at least one of (i) one or more first metrics associated with one or more applications running on the client STA, (ii) one or more second metrics associated with one or more communication links established between the client STA and the AP, or (iii) one or more third metrics associated with wireless sensing feedback from the client STA.

7. The computer-implemented method of claim 1, wherein the ML model is configured to use channel state information (CSI) metrics associated with mobility of the client STA to determine that the client STA is moving towards an edge of a cell of the AP.

8. The computer-implemented method of claim 1, further comprising updating, based on the ML model, a TID-to-link map of another client STA associated with the AP to move at least some traffic from the second communication link, such that the second communication link is available for the traffic from the application.

9. A system comprising:

a memory; and a processor communicatively coupled to the memory, the processor being configured to perform an operation comprising:

obtaining one or more metrics associated with communication between a client station (STA) and an access point (AP) in a wireless network, wherein the communication between the client STA and the AP is based on a first traffic identifier (TID)-to-link map that allocates traffic from an application running on the client STA to a first communication link established between the client STA and the AP;

determining a second TID-to-link map, different from the first TID-to-link map, based at least in part on evaluating the one or more metrics with a machine learning (ML) model, wherein:

the ML model is configured to output an indication of a second communication link, different from the first communication link, established between the client STA and the AP that satisfies target performance criteria for the application;

the ML model is further configured to output an indication of a time instance when the first communication link established between the client STA and the AP will not satisfy the target performance criteria for the application; and the second TID-to-link map allocates the traffic from the application to the second communication link established between the client STA and the AP; and performing communications between the client STA and the AP on the second communication link, based on the second TID-to-link map, wherein performing the communications comprises moving the traffic from the first communication link to the second communication link prior to the time instance.

10. The system of claim 9, wherein:

the first communication link is associated with a first radio of the AP that is configured to operate on a first band; and the second communication link is associated with a second radio of the AP that is configured to operate on a second band.

11. The system of claim 9, wherein:

the first communication link is associated with a first radio of the AP that is configured to operate on a first band using a first transmission power scheme; and the second communication link is associated with a second radio of the AP that is configured to operate on the first band using a second transmission power scheme.

12. The system of claim 9, wherein the application is a quality-of-service (QoS)-sensitive application.

13. The system of claim 9, wherein the ML model is trained using a dataset comprising at least one of (i) a set of application metrics, (ii) a set of communication link metrics, or (iii) a set of wireless sensing feedback.

14. The system of claim 9, wherein the one or more metrics comprise at least one of (i) one or more first metrics associated with one or more applications running on the client STA, (ii) one or more second metrics associated with one or more communication links established between the client STA and the AP, or (iii) one or more third metrics associated with wireless sensing feedback from the client STA.

15. A non-transitory computer-readable storage medium comprising computer executable code, which when executed by one or more processors, performs an operation comprising:

obtaining one or more metrics associated with communication between a client station (STA) and an access point (AP) in a wireless network, wherein the communication between the client STA and the AP is based on a first traffic identifier (TID)-to-link map that allocates traffic from an application running on the client STA to a first communication link established between the client STA and the AP;

determining a second TID-to-link map, different from the first TID-to-link map, based at least in part on evaluating the one or more metrics with a machine learning (ML) model, wherein:

the ML model is configured to output an indication of a second communication link, different from the first communication link, established between the client STA and the AP that satisfies target performance criteria for the application;

the ML model is further configured to output an indication of a time instance when the first communication link established between the client STA and the AP will not satisfy the target performance criteria for the application; and the second TID-to-link map allocates the traffic from the application to the second communication link established between the client STA and the AP; and performing communications between the client STA and the AP on the second communication link, based on the second TID-to-link map, wherein performing the communications comprises moving the traffic from the first communication link to the second communication link prior to the time instance.

16. The non-transitory computer-readable storage medium of claim 15, wherein:

the first communication link is associated with a first radio of the AP that is configured to operate on a first band using a first transmission power scheme; and the second communication link is associated with a second radio of the AP that is configured to operate on the first band using a second transmission power scheme.

17. The non-transitory computer-readable storage medium of claim 15, wherein:

the first communication link is associated with a first radio of the AP that is configured to operate on a first band; and the second communication link is associated with a second radio of the AP that is configured to operate on a second band.

18. The non-transitory computer-readable storage medium of claim 15, wherein the application is a quality-of-service (QoS)-sensitive application.

19. The non-transitory computer-readable storage medium of claim 15, wherein the ML model is trained using a dataset comprising at least one of (i) a set of application metrics, (ii) a set of communication link metrics, or (iii) a set of wireless sensing feedback.

20. The non-transitory computer-readable storage medium of claim 15, wherein the one or more metrics comprise at least one of (i) one or more first metrics associated with one or more applications running on the client STA, (ii) one or more second metrics associated with one or more communication links established between the client STA and the AP, or (iii) one or more third metrics associated with wireless sensing feedback from the client STA.

* * * * *